(No Model.)
W. C. LOCKWOOD.
TELEPHONY.
No. 469,706. Patented Mar. 1, 1892.
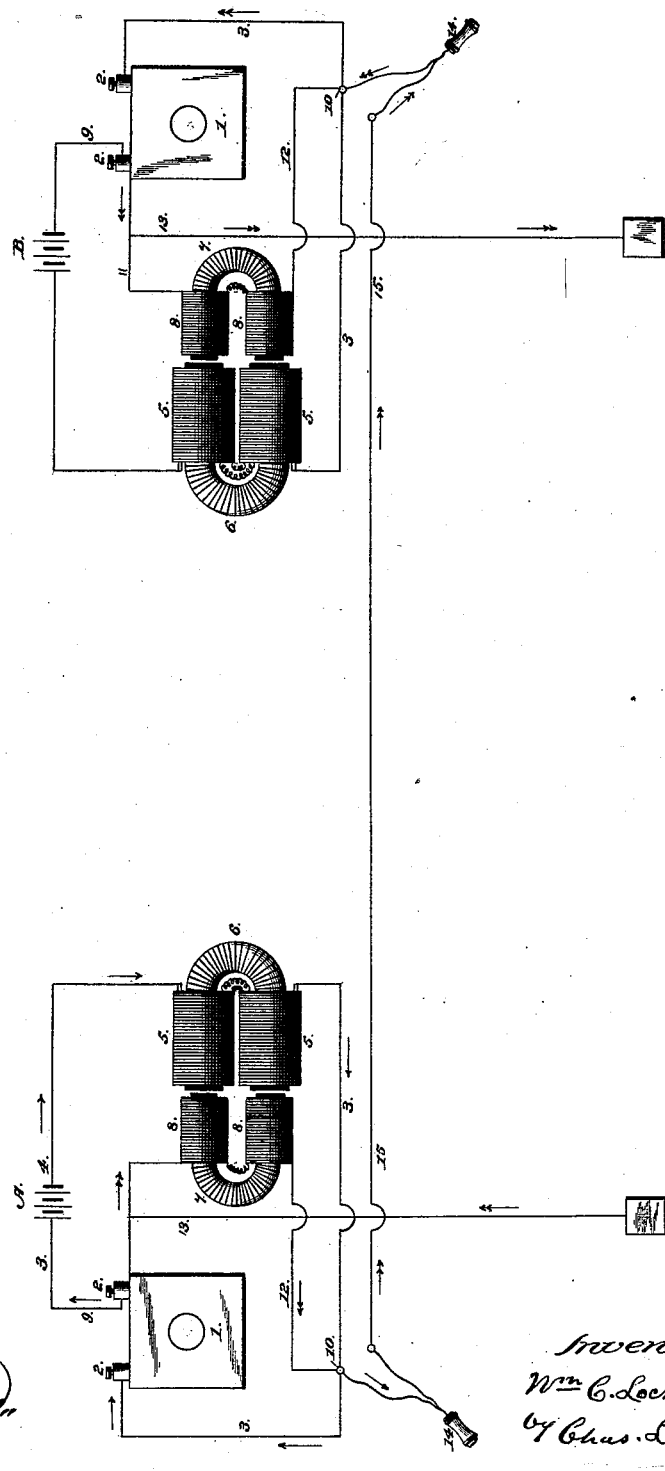
Witnesses:
Inventor:
Wm C. Lockwood
by Chas. L. Coomb
Attorney.

UNITED STATES PATENT OFFICE.

WILLIAM C. LOCKWOOD, OF NEW YORK, N. Y.

TELEPHONY.

SPECIFICATION forming part of Letters Patent No. 469,706, dated March 1, 1892.

Application filed September 29, 1891. Serial No. 407,097. (No model.)

*To all whom it may concern:*

Be it known that I, WILLIAM C. LOCKWOOD, a citizen of the United States, residing at New York, in the county and State of New York, have invented certain new and useful Improvements in Telephones and Telephonic Systems; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

This invention relates to certain improvements upon the invention for which Letters Patent of the United States were granted to me the 27th day of July, 1886, No. 346,377, for improvements in telephones, and which had for its objects to provide for passing a powerful current capable of overcoming a great resistance through the main line of a telephonic system by the inductive magnetic action of the cores of a series of spools embraced in a local or battery and transmitter circuit upon the core of an independent spool embraced in the main or receiver circuit.

The present invention has the same objects in view.

The above-mentioned objects are attained by the means illustrated in the accompanying drawing, which represents a diagram showing my telephonic system complete.

Referring to the drawing, the numeral 1 indicates a transmitter of any suitable description—such as the Blake, for instance, in which, however, the induction-coil usually employed is omitted, the contact-bearings of such transmitter being connected directly to the binding-posts 2.

The numeral 3 indicates a local-circuit conductor embracing a battery 4 and the spools 5 of an electro-magnet 6, the electro-magnet being, preferably, of the horseshoe form, and so represented in the present instance.

The numeral 7 indicates a similar electro-magnet located so that its poles will be opposite the poles of the electro-magnet 6 nearly but not in contact with said magnet. The numeral 8 indicates the spools of the magnet 7, the terminals of the coils of which connect with the conductor of the local circuit at the points 9 and 10 by means of the conductors 11 and 12. From the conductor 11 extends a conductor 13, which connects with the ground, as shown.

The numeral 14 indicates a magneto-telephonic receiver of the usual description, one terminal of the coil of which connects with the local-circuit conductor 3, preferably at the point of connection 10 of the conductor 12. The other terminal connects with the main-line conductor 15, leading to a distant station, at which is located a system of devices and circuits identical to that above described. The spools 5 are doubly wound with coils of different resistance—say, for instance, one coil may be of No. 28 wire and the other of No. 22. The respective coils are wound parallel with each other and equalize the current of the primary. For instance, if ten cells of a battery are in the primary circuit with a fifty-mile main line and it is wished to connect the same instrument in a ten-mile line the battery-current will divide through the double-wound spool and balance. The spools of the magnet 7 are singly wound and are of greater resistance than the coils 5 of the magnet 6, the coils of said magnet being of No. 36 wire, for instance. The relative resistances of the coils, however, will depend upon the length of the line and various circumstances, and will have to be varied as occasion requires.

The operation of my invention will be readily understood in connection with the above description and is as follows: The systems at the different stations being connected, as shown in the drawing, and which for convenience are designated by the letters A and B, it will be assumed, for instance, that transmission is to be effected from A to B. It will be observed that there is a constant electric current established and maintained through the local-circuit transmitter and coils 5. Upon speaking into the transmitter the undulations caused in the current of the local circuit cause the magnet 6 to act inductively upon the magnet 7, establishing an induced current through the coils 8. The contact-points of the home-station transmitter when the diaphragm is vibrated offer a greater resistance than the transmitter at the distant station, where the contacts are undisturbed during the variations of the current. Hence the current from the home station is not short-circuited, but naturally goes over the line, the secondary or induced current being forced or assisted over the line by a portion of the primary current, which also goes to the line. The course of the current of the local circuit is indicated by the single-headed arrows, the course of the current of the main or line circuit being indicated by double-headed arrows.

It will be perceived that in my improved system the secondary or circuit carrying the induced current is arranged within the local circuit and that both circuits are grounded by a common conductor.

I claim—

1. In a telephonic system, a local circuit embracing a transmitter, a battery, and an electro-magnet, in combination with a circuit arranged within said local circuit and embracing an electro-magnet and conductors connecting with said local circuit and the line and ground conductors, whereby the circuits are grounded, substantially as specified.

2. In a telephone system, a local circuit embracing a transmitter and an electro-magnet, in combination with a secondary circuit embracing an electro-magnet and a conductor connecting said local and secondary circuits with the line conductor and ground, whereby a secondary or induced current is impelled or forced over the line by the primary current, as specified.

3. In a telephone system, the combination of the horseshoe-magnets with opposing poles, the coils of one being in a local circuit embracing a battery and transmitter and the coils of both being in circuit with the main line and ground, whereby an enforced secondary current is driven over the main line, substantially as specified.

In testimony whereof I affix my signature in presence of two witnesses.

WM. C. LOCKWOOD.

Witnesses:
 E. W. DASHIELL,
 M. P. CALLAN.